(12) United States Patent
Kuroda

(10) Patent No.: US 7,215,510 B2
(45) Date of Patent: May 8, 2007

(54) MAGNETIC HEAD AND MAGNETIC RECORDING/REPRODUCING APPARATUS FOR A VIDEO TAPE RECORDER, AND A METHOD OF MANUFACTURING THE SAME

(75) Inventor: Susumu Kuroda, Tokyo (JP)

(73) Assignee: Sony Corporation (JP)

( * ) Notice: Subject to any disclaimer, the term of this patent is extended or adjusted under 35 U.S.C. 154(b) by 18 days.

(21) Appl. No.: 10/395,086

(22) Filed: Mar. 25, 2003

(65) Prior Publication Data
US 2003/0227720 A1  Dec. 11, 2003

(30) Foreign Application Priority Data
Mar. 28, 2002  (JP) .......................... P2002-090430

(51) Int. Cl.
*G11B 5/52* (2006.01)
(52) U.S. Cl. .................................. 360/122; 360/271.5
(58) Field of Classification Search ................ 360/122, 360/271.1, 271.5, 313, 130.22, 130.23, 130.24
See application file for complete search history.

(56) References Cited

U.S. PATENT DOCUMENTS

| | | | | |
|---|---|---|---|---|
| 4,531,170 A | * | 7/1985 | Takei et al. .................. | 360/119 |
| 5,781,383 A | * | 7/1998 | Strand ........................ | 360/122 |
| 5,852,536 A | * | 12/1998 | Matsunaga et al. .......... | 360/122 |
| 5,978,185 A | * | 11/1999 | Abe et al. .................... | 360/122 |
| 6,023,396 A | * | 2/2000 | Chun et al. .................. | 360/122 |
| 6,151,191 A | * | 11/2000 | Muftu et al. ............... | 360/271.1 |
| 6,411,473 B1 | * | 6/2002 | Ozue et al. ................ | 360/271.5 |
| 6,590,741 B1 | * | 7/2003 | Hasegawa et al. .......... | 360/122 |
| 6,801,390 B2 | * | 10/2004 | Kanno et al. ............... | 360/122 |
| 6,922,310 B2 | * | 7/2005 | Sato et al. ................... | 360/122 |
| 6,989,961 B2 | * | 1/2006 | Matsui et al. .............. | 360/122 |
| 2003/0179504 A1 | * | 9/2003 | Kondo et al. ............. | 360/271.5 |
| 2004/0085672 A1 | * | 5/2004 | Matsui et al. ............... | 360/122 |

FOREIGN PATENT DOCUMENTS

| | | | | |
|---|---|---|---|---|
| JP | 05234014 A | * | 9/1993 | |
| JP | 06012637 A | * | 1/1994 | |
| JP | 2001-043215 | | 2/2001 | |
| JP | 2001-118220 | | 4/2001 | |

* cited by examiner

*Primary Examiner*—Brian E. Miller
(74) *Attorney, Agent, or Firm*—Rader Fishman & Grauer PLLC; Ronald P. Kananen

(57) ABSTRACT

A magnetic head comprises an MR element, and a substrate supporting the MR element from both sides at a center portion, and a magnetic tape is in contact and slide-contact with a slide-contact surface thereof. A curvature in a thickness direction of the slide-contact surface is set to be larger at a center portion than at both sides thereof. In this way, it is possible to protect the slide-contact surface of the magnetic head from eccentric wear and avoid deterioration of the magnetic head performance.

6 Claims, 7 Drawing Sheets

PRIOR ART

PRIOR ART

MAGNETIC HEAD AND MAGNETIC RECORDING/REPRODUCING APPARATUS FOR A VIDEO TAPE RECORDER, AND A METHOD OF MANUFACTURING THE SAME

CROSS REFERENCES TO RELATED APPLICATIONS

The present document is based on Japanese Priority Document JP 2002-090430, filed in the Japanese Patent Office on Mar. 28, 2002, the entire contents of which being incorporated herein by reference.

BACKGROUND OF THE INVENTION

1. Field of the Invention

The present invention relates to a magnetic head used for reproducing information from a tape magnetic recording medium employed in a VTR (video tape recorder), a digital VTR or the like, a method of manufacturing the magnetic head, and a magnetic recording/reproducing apparatus employing the magnetic head.

2. Description of the Related Art

In later years, with the progress in digitalization of image signals and computer-related technology, the amount of information increases exponentially. In a digital VTR or a tape streamer device for accumulating, storing an reproducing such a large amount of information, in order to improve performance of a magnetic recording/reproducing system therein so as to deal the large amount of information at high speed and promptly, research and development for providing the magnetic recording/reproducing system with a multi-head, a high-speed rotating drum, a narrow track, and a short wavelength have been made.

However, as for the inductive-type magnetic head which has been used widely, since the magnetic resistance of the head cannot be unlimitedly reduced due to the limit of the capability of the head itself, for example, physical limit of the permeability of a magnetic material, it is quite difficult to largely improve a real density thereof.

Therefore, attempts have been made to utilize a magnetic head employing an MR element utilizing the magnetoresistive effect, in place of the conventional inductive head, in a magnetic recording/reproducing apparatus using a magnetic tape, such as a helical scan system.

By the way, as shown in FIG. 10, in a case of using a magnetic head 102 employing a shield-type MR element on a rotary head drum 101 in a magnetic recording/reproducing apparatus, a slide-contact surface 102a of the magnetic head 102 is exposed toward a magnetic tape 103, and the magnetic tape 103 is in slide-contact with the slide contact surface 102a. Herein, an exposed amount δ of the slide-contact surface 102a of the magnetic head 102 from an outer peripheral of the rotary head drum 101 is called "head projection amount". On the other hand, since output intensity of the magnetic head 102 is substantially inversely proportional to an MR head height h (refer to FIG. 6), the MR head height is preferably as small as possible. Usually, the MR head height is set in a range of 0.5–3 μm.

As shown in FIG. 11A, a curvature in a width direction of the slide-contact surface 102a of the magnetic head 102 is formed to be Rx, while, as shown in FIG. 11B, a curvature in a thickness direction of the slide-contact surface 102a of the magnetic head 102 is formed to be Ry.

SUMMARY OF THE INVENTION

In the magnetic recording/reproducing apparatus, as described above, since the magnetic tape 103 is in contact with and slides on the slide-contact surface 102a of the magnetic head 102, the slide-contact surface 102a is worn away so that the magnetic head 102 cannot fully demonstrate its intrinsic capability. Accordingly, there is a need for suppressing wear of the slide-contact surface 102a of the magnetic head 102 so that the wear of the slide-contact surface 102a is as little as possible.

Tape tension and abrasive ability of the magnetic tape 103 affect on the wear of the slide-contact surface 102a of the magnetic head 102.

As the magnetic tape 103, an MP tape (a metal particle tape) and an ME tape (metal-evaporated tape) are used. The MP tape is used in a condition of high tape tension owing to its characteristic feature, and has high abrasive ability. On the other hand, the ME tape is used in a condition of low tape tension, compared with the MP tape, and has low abrasive ability.

Accordingly, in a case of using the MP tape as the magnetic tape 103, as shown in FIG. 12 with a double-dotted chained line, the slide-contact surface 102a of the magnetic head 102 is worn away to be a similar figure to an initial shape along the curvature Ry.

On the other hand, as described above, the ME tape is used with a lower tape tension and has less abrasive ability. Therefore, in a case of using the ME tape as the magnetic tape 103, the wear of the magnetic head 102 is accelerated at a position where a head surface pressure increases at around an entrance to the drum or an exit from the drum. The slide-contact surface 102a of the magnetic head 102 is worn away more at a center portion in relation to both side portions thereof, as shown in FIG. 13 with a double-dotted chained line, that is, the slide-contact surface 102a is eccentrically worn. This further deteriorates the performance of the magnetic head 102.

As a method suppressing the wear of the slide-contact surface 102a of the magnetic head 102, there have been known not only a method employing a hard and less-wearing material for a head core or a shield of the magnetic head but also a method employing a protective film for less wearing (as disclosed in Japanese Patent Application Publication 2001-43215) and a method providing a groove in the vicinity of the head so as to have less surface pressure of the head (as disclosed in Japanese Patent Application Publication 2001-118220). However, when the head surface is physically hardened or the groove is provided around the head, the magnetic tape is more damaged at the time being in contact with the head, which affects on durability of the magnetic tape.

In view of the above disadvantage, the present invention provides a magnetic head capable of suppressing deterioration of performance owing to the eccentric wearing or the like, without hardening the head surface physically and without providing a groove in the vicinity of the head, and also provides a manufacturing method of the magnetic head and a magnetic recording/reproducing apparatus employing the magnetic head.

According to the present invention, with regard to the curvature in the thickness direction of the slide-contact surface of the magnetic head, a curvature at the center portion is set to be larger than a curvature of the both side portions. Thus, the wear of the center portion at an initial period is eliminated so that the deterioration in the performance of the magnetic head can be avoided.

The following effects may be obtained in accordance with the present invention:

(1) The present invention reduces the wear, especially, eccentric wear of the magnetic head and avoids deterioration of magnetic head performance without providing a protective film on the magnetic head, as in the conventional example;

(2) The spacing between the magnetic tape and the MR element according to the present invention prevents the MR element from being worn away;

(3) The tape tension of the magnetic tape per tape width set to approximately 0.5–1.0 gf/mm at around the entrance to the drum in accordance with the present invention suppresses the wear of the magnetic head by the magnetic tape at around the entrance to the drum; and (4) According to the method of the present invention, the magnetic head with a plurality of curvatures in the thickness direction of the slide-contact surface can be formed using several kinds of abrasive containing lapping tape each having different stiffness. First, the slide-contact surface of the magnetic head is lapped using a lapping tape with low stiffness and, next, the slide-contact surface is lapped using a lapping tape with high stiffness. This enables the lapping in a sequential order from the part with the smaller curvature at the outer side to the part with the larger curvature at the inner side.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
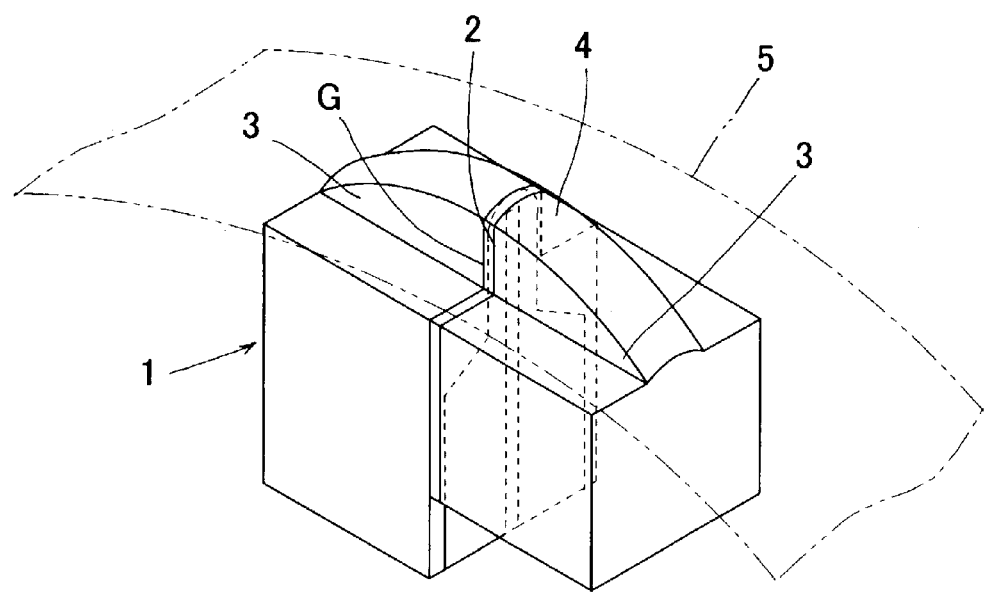
FIG. 1 is a perspective view of a magnetic head.
Figure 2A:
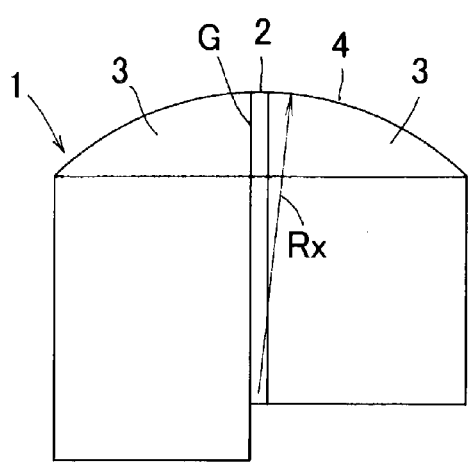
FIG. 2A is a front view of the magnetic head in a width direction.
Figure 2B:
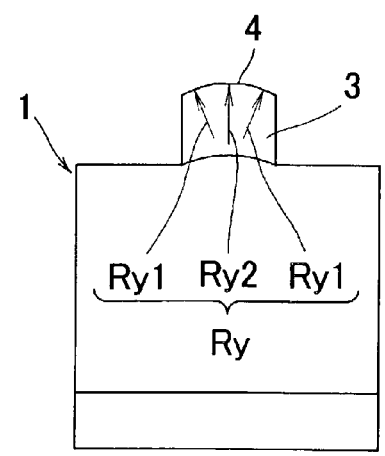
FIG. 2B is a front view of the magnetic head in a thickness direction.
Figure 3:
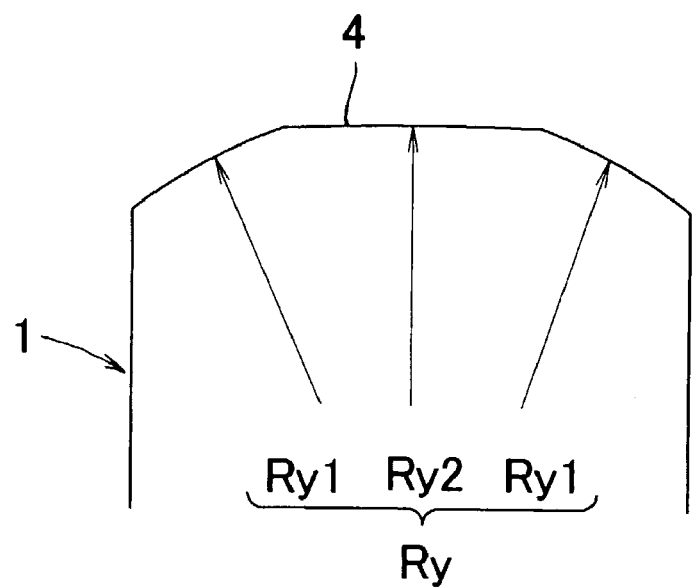
FIG. 3 is an enlarged view of a main part of the magnetic head of FIG. 2B.

Now, the present invention is explained with reference to the attached drawings. FIG. 1 is a perspective view showing a magnetic head (hereinafter, referred to as MR head) 1. The MR head 1 comprises an MR element 2 and a substrate 3 which supports the MR element 2 at a head gap portion G at the center thereof from both sides. A magnetic tape 5 comes in contact with and slides on a slide-contact surface 4 of the MR head 1. As shown in FIG. 2A, the slide-contact surface 4 of the MR head 1 is formed to have a uniform curvature Rx in a width direction. In addition, as shown in FIG. 2B and enlargedly shown in FIG. 3, a curvature Ry in a thickness direction of the slide-contact surface 4 comprises a plurality of large and small curvatures. A curvature Ry 2 at a center portion thereof is set to be larger than a curvature Ry1 at both side portions. For example, the curvature Ry1 at the both side portions is formed to be 0.5–3 mm and the curvature Ry2 at the center portion is formed to be 5 mm to ∞.

Figure 4:
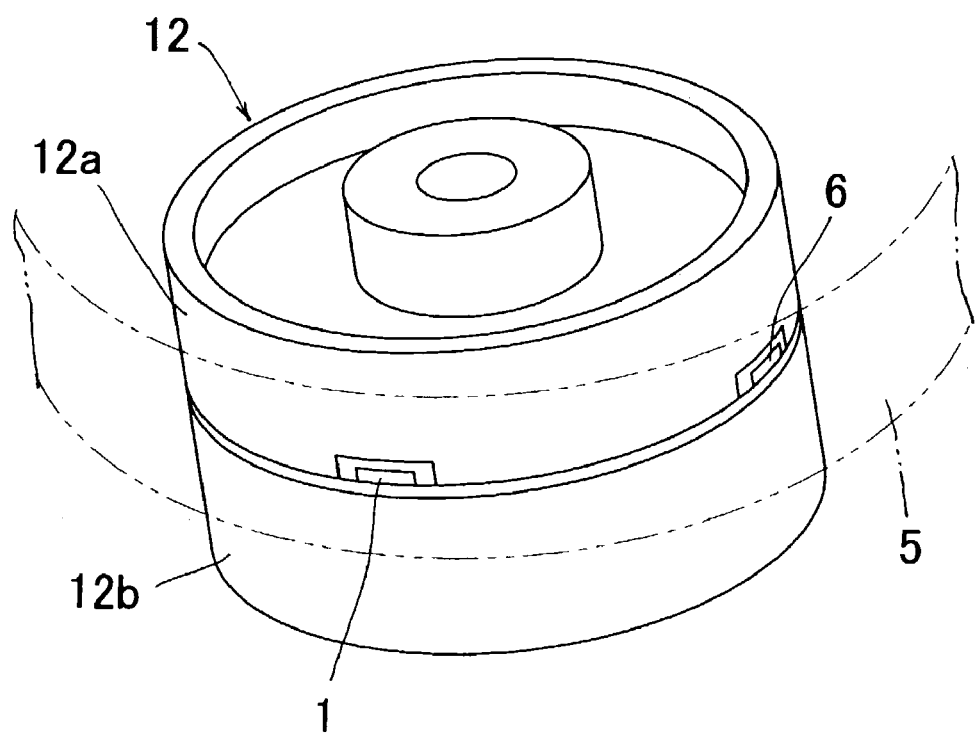
FIG. 4 is a perspective view of a rotary head drum.

As shown in FIG. 4, the MR head 1 is attached to a rotary drum 12 of a magnetic recording/reproducing apparatus 11, which will be described next, as a reproducing head. The rotary head drum 12 comprises a rotating upper drum 12$a$ and a fixed lower drum 12$b$. The reproducing MR head 1 and a recording magnetic head 6 are positioned to have a phase of 90° to each other between the upper drum 12$a$ and the lower drum 12$b$. The rotary head drum rotates in a state slanted with a predetermined angle.

Figure 5:
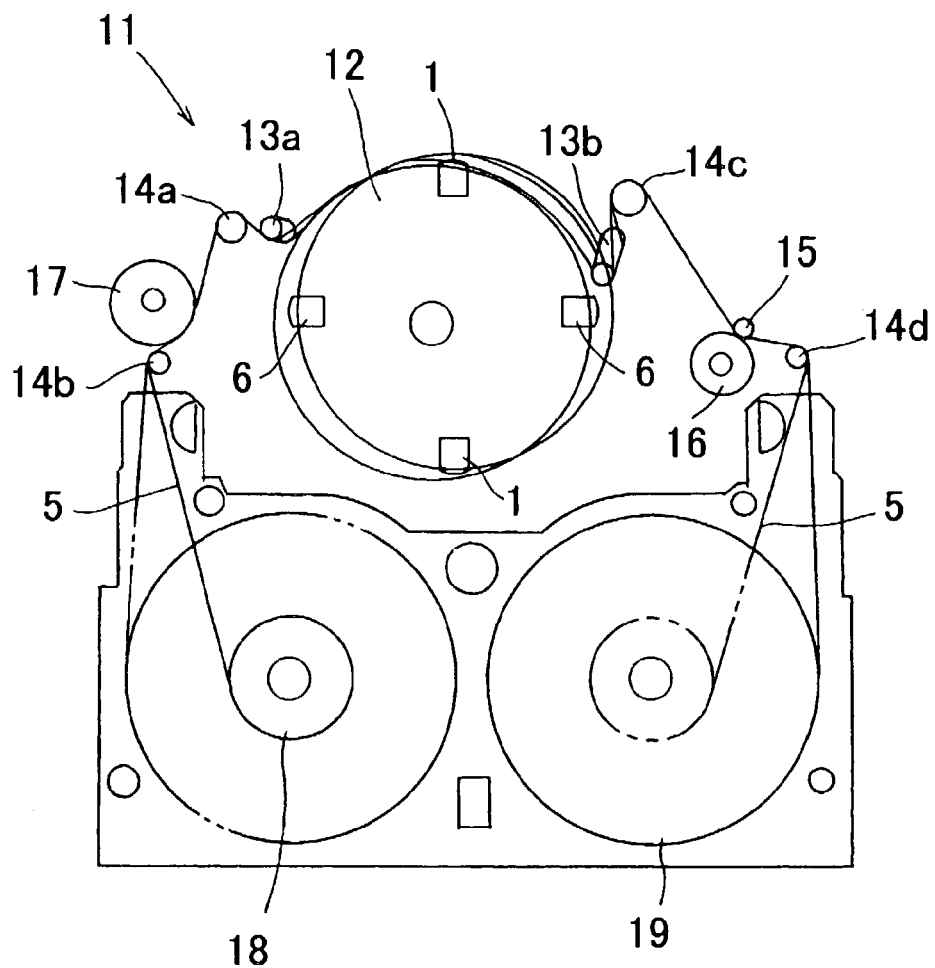
FIG. 5 is a plan view of a recording/reproducing apparatus.

As shown in FIG. 5, the magnetic recording/reproducing apparatus 11 includes the rotary head drum 12, a pair of inclined posts 13$a$ and 13$b$, which wind the magnetic tape 5 on an outer peripheral surface of the rotary head drum 12 with a predetermined winding angle, a plurality of tape guides 14$a$–14$d$, a pinch roller 15, a capstan 16, a tension roller 17, a tape supply reel 18 and a tape take-up reel 19. The magnetic tape 5 taken out from the tape supply reel 18 runs along the outer peripheral surface of the rotary head drum 12 in an inclined condition by the pinch roller 15 and the capstan 16, and then is wound around the tape take-up reel 19.

Figure 6:
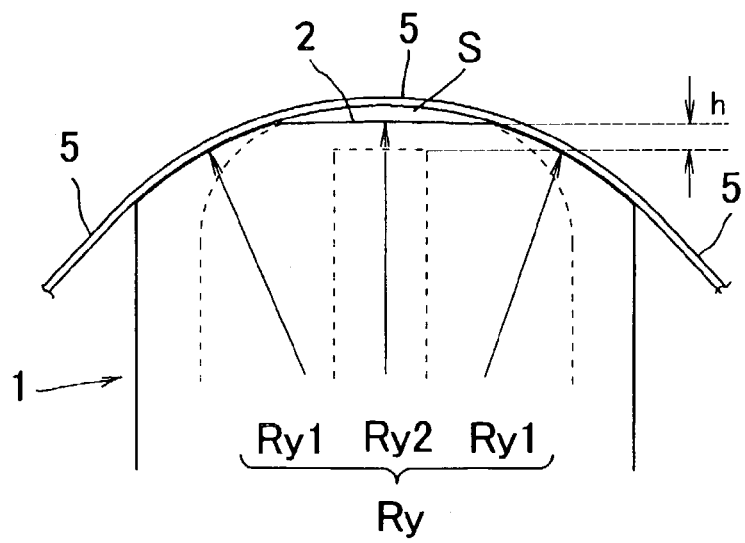
FIG. 6 is a view explaining relationship between an MR head and a magnetic tape.

As shown in FIG. 6, the MR element 2 and the magnetic tape 5 which is in slide-contact with the slide-contact surface 4 of the MR head 1 have a fixed spacing S therebetween. In addition, the magnetic tape 5 is set to have a tape tension of 0.5–1.0 gf/mm per magnetic tape width in the vicinity of an entrance to the rotary head drum, and a head projection amount of 5–30 μm.

Next, the operation of the MR head 1 and a magnetic recording/reproducing apparatus 11 will be described. As described above, in the present embodiment, with regard to the curvature Ry in the thickness direction of the slide-contact surface, the curvature Ry2 at the center portion of the slide-contact surface 4 is set larger than the curvature Ry1 at the both side portions. Therefore, the portion around a head gap at the center portion of the MR head 1 comes into contact with the magnetic tape 5 at around the entrance to and the exit from the rotary head drum, while the MR head 1 does not heavily contact the magnetic tape 5 at a portion other than around the entrance to and the exit from the rotary head drum. Accordingly, the wear of the MR head 1 can be largely suppressed. The operation of suppressing wearing becomes significant as the magnetic tape 5 becomes thinner and lowers its stiffness. Accordingly, the present invention is more effective when applied for a thinner and larger-capacity magnetic tape.

Figure 7:
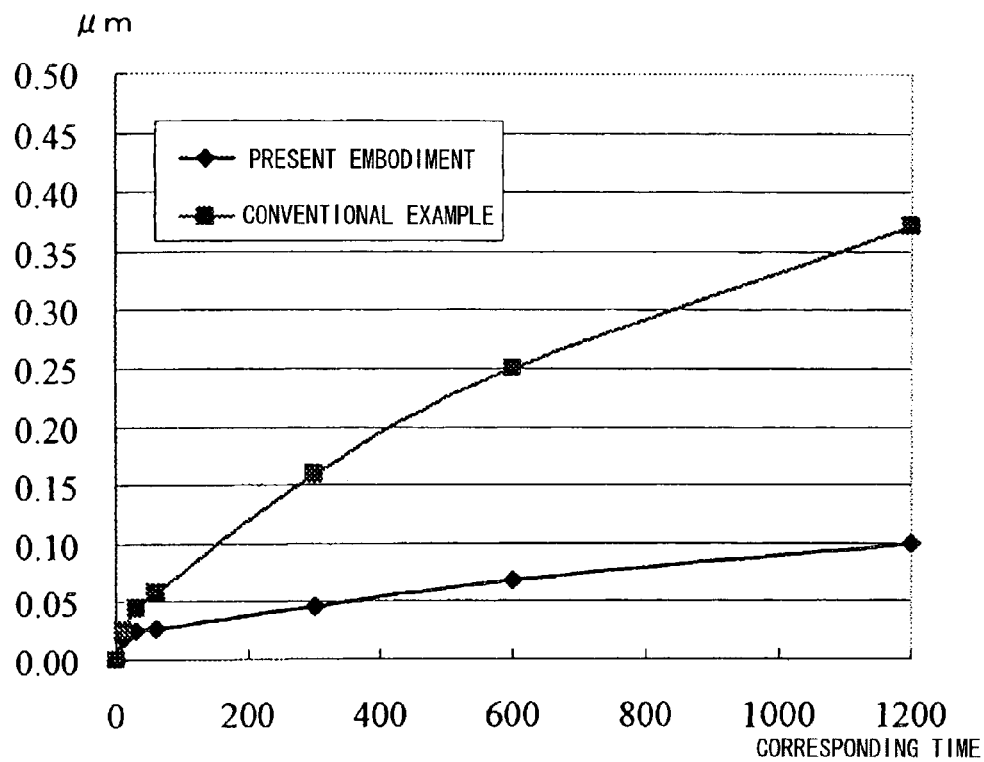
FIG. 7 is a graph showing an effect of the magnetic head of the present invention in comparison with a conventional magnetic head.

FIG. 7 shows an experimental result in which an initial worn amount in a case of setting the curvature Ry2 at the center portion larger than the curvature Ry1 of the both side portions is compared the an initial worn amount in a case of uniformly setting a curvature in the thickness direction. From the result, it was proved that the initial worn amount of the MR head 1 of the present invention was largely improved compared with the conventional example.

Next, a manufacturing apparatus (lapping machine) and a manufacturing method (lapping method) of the MR head 1 described above.

Figure 8:
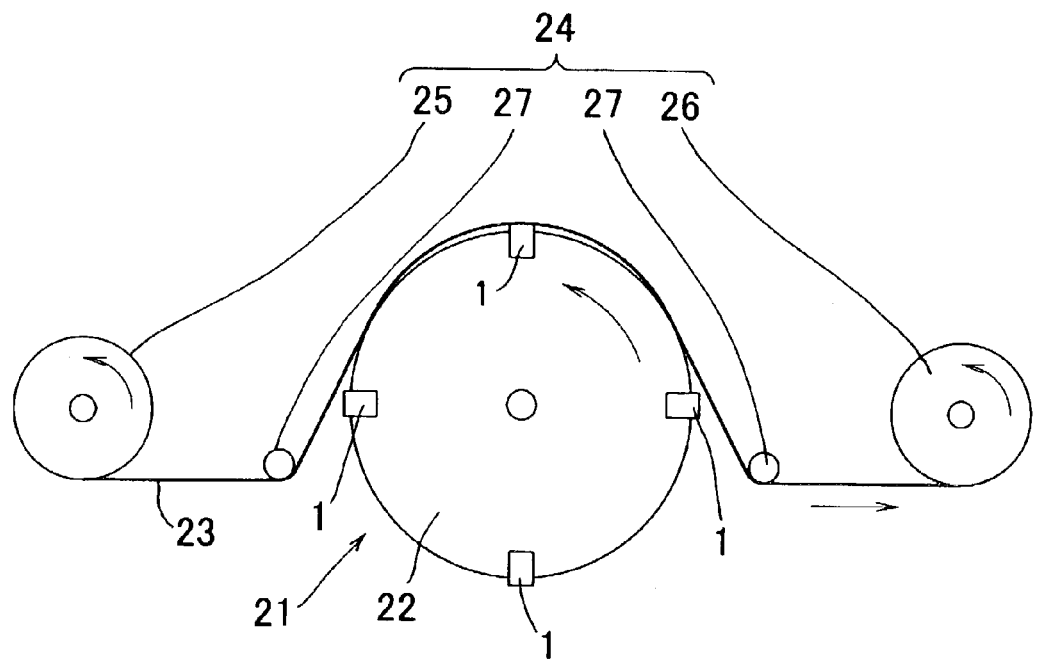
FIG. 8 is a plan view of a lapping machine.

FIG. 8 is a summarized plan view of a manufacturing apparatus (hereinafter, referred to as lapping machine) 21 of the MR head 1. The lapping machine 21 includes a rotary drum 22 to which a plurality of untapped MR heads 1 as targets to be lapped are attached, a head lapping tape 23 which is wound and runs around the rotary drum 22 with a predetermined winding angle, and a tape feeder mechanism 24.

The tape feeder mechanism 24 includes a tape supply reel 25 and a tape take-up reel 26 and a plurality of tape guides 27. In accordance with the difference between the rotational speed of the tape supply reel 25 and the tape take-up reel 26, the tape tension of the head lapping tape 23 can be changed.

The rotary drum 22 is formed substantially similar to the rotary head drum 12 of the magnetic recording/reproducing apparatus 11. The plurality of untapped MR heads 1 are detachably attached so that the slide-contact surfaces 4 thereof are projected from the outer peripheral surface of the drum. On the other hand, the head lapping tape 23 is formed by adhering an abrasion material on a surface of a base layer of PET (Polyethylene terephthalate).

The base layer of the head lapping tape 23 is formed to have a thickness in a range of 10–50 μm, and head lapping tapes 23 of several thickness for the base layer thereof are prepared in advance.

Next, the method of manufacturing the MR head 1 using the lapping machine 21 will be explained. In the present method, first of all, a part with a small curvature Ry1 is lapped and formed, and, a part with a large curvature Ry2 is lapped and formed subsequently.

The part with the small curvature Ry1 is formed by lapping the slide-contact surface 4 of the not-yet-lapped MR head 1, that is, the lapping target, using the head lapping tape 23 having a base layer thickness of 15 μm at a tape tension of 30 gf/mm. After forming the part with the small curvature Ry1, the part with the large curvature Ry2 is formed by lapping the slide-contact surface 4 of the MR head 1 using another head lapping tape 23 having a base layer thickness of 30 μm at a tape tension of 15 gf/mm.

In this way, it is possible to form the part with the small curvature Ry1 and the part with the large curvature Ry2 in a sequential order by varying the thickness of the base layer, that is, the tape stiffness, of the head lapping tape 23 and the tape tension thereof. In addition, it is also possible to form any desired curvature by appropriately changing the base layer thickness and the tape tension of the head lapping tape 23.

Figure 9:
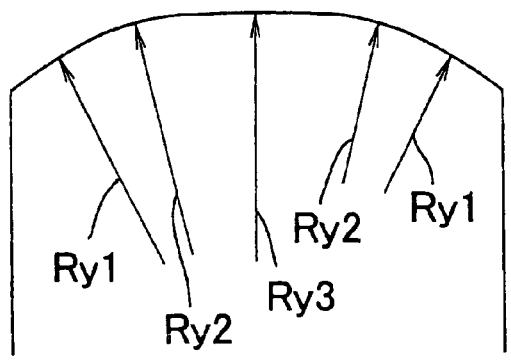
FIG. 9 is an enlarged view of a main part of a magnetic head of another embodiment.
Figure 10:
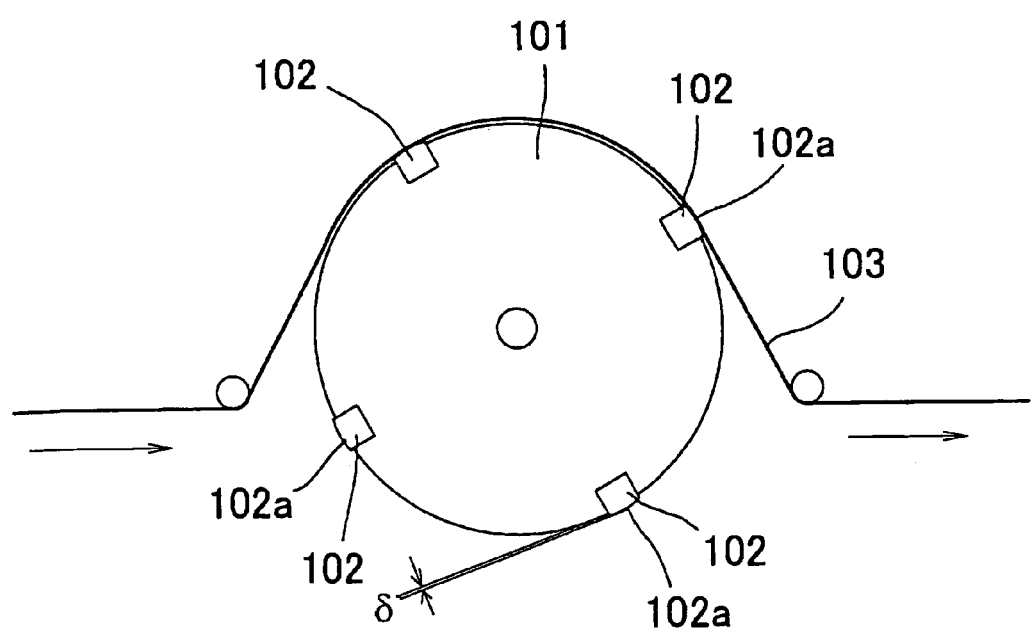
FIG. 10 is a plan view of a conventional example.
Figure 11A:
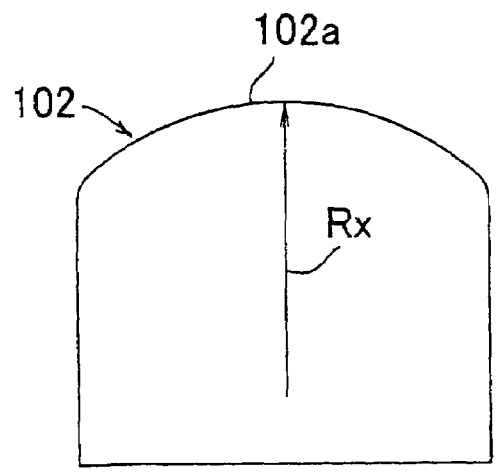
FIG. 11A is a front view of the magnetic head of the conventional example in a width direction.
Figure 11B:
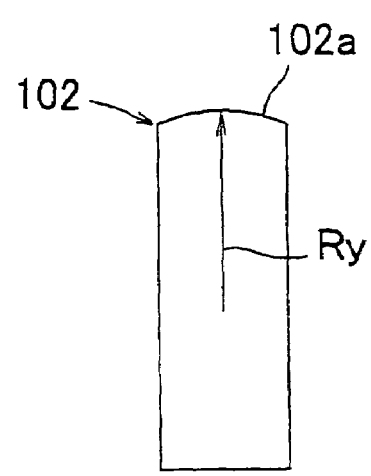
FIG. 11B is a front view of the magnetic head in a thickness direction.
Figure 12:
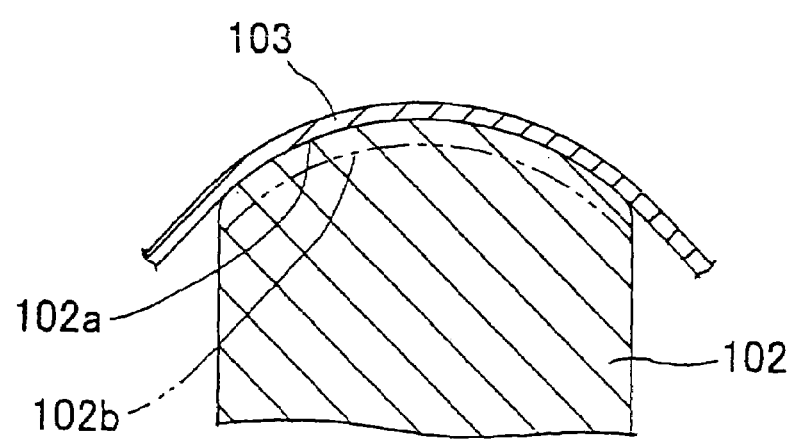
FIG. 12 is a view explaining a state where the magnetic head of the conventional example is worn away in a case of using an MP tape as the magnetic tape.
Figure 13:
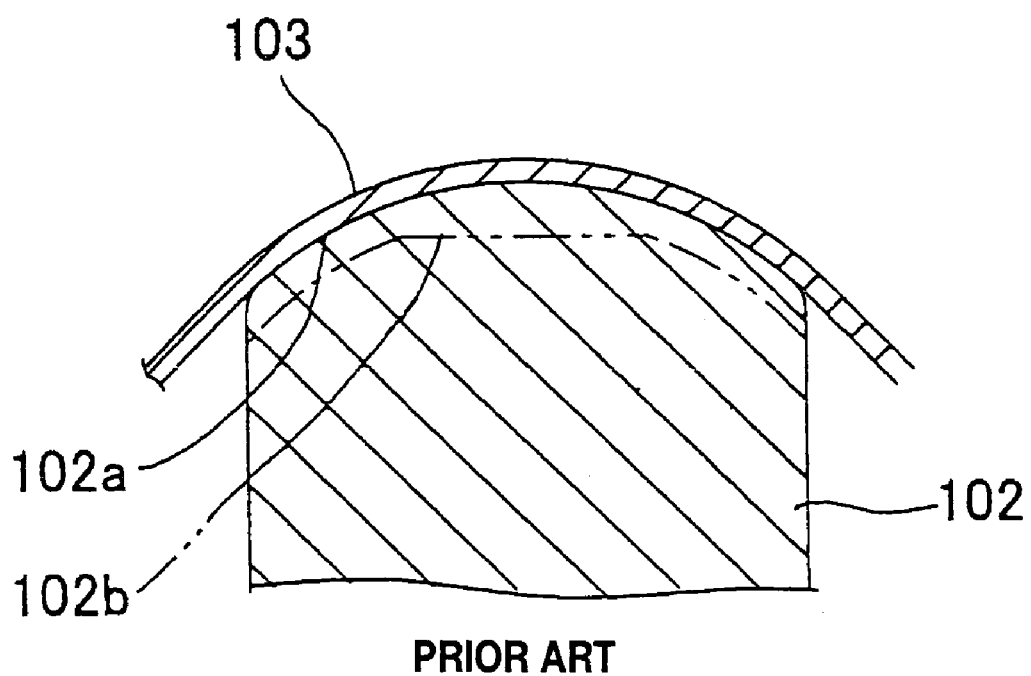
FIG. 13 is a view explaining a state where the magnetic head of the conventional example is worn away in a case of using an ME tape as the magnetic tape.

It is also possible to form the part with the large curvature Ry2 not by lapping with the lapping machine 21 but by adjusting the tape tension of the magnetic tape in the similar way to the case of the lapping machine 21, and lapping the MR head 1 after it is built in the magnetic recording/ reproducing apparatus, such as a VTR or a streamer. In this case, it is necessary to take the lapping amount in consideration and to form of the part with the small curvature Ry1 to have a relatively large height. In the above embodiment, the case with two curvatures has been described. However, as shown in FIG. 9, there may be three or more curvatures in ascending order from an outer side to the center. In this case, the MR head 1 is formed from the part with the small curvature, positioned at the outer side, to the part with the large curvature, positioned at the inner side.

In the present embodiments, the case where a plurality of curvatures are provided in the thickness direction has been described. However, if necessary, there may be provided a plurality of curvatures in the width direction instead of the thickness direction.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic head of a magnetic recording medium having a magnetic tape, said magnetic head comprising:
   an MR element;
   a substrate supporting the MR element from both sides thereof at a center portion, in which the magnetic tape of the magnetic recording medium is in slide-contact directly with or through an air cushion relative to a slide-contact surface of said substrate,
   wherein said slide contact surface has three slide contact surfaces and a curvature of the center slide contact surface in a thickness direction of said slide-contact surface is set to be larger than that of both of the other two side contact surfaces so that the magnetic tape and the center slide-contact surface have a fixed spacing therebetween and the magnetic tape and the other two side contact surfaces are in direct contact with the magnetic tape,
   wherein said magnetic head is mounted on a rotary drum and is used for reproducing information recorded on the magnetic tape.

2. A magnetic recording/reproducing apparatus comprising:
   a rotary drum having a recording magnetic head and a reproducing magnetic head; and
   magnetic tape wound on the rotary drum,
   wherein said reproducing magnetic head comprises an MR element, and a substrate supporting the MR element from both sides at a center portion, and a magnetic tape is in slide-contact directly with or through an air cushion relative to a slide-contact surface of the substrate, and
   said slide contact surface has three slide contact surfaces and a radius of curvature of the center slide contact surface in a thickness direction of said slide-contact surface is set to be larger at a center portion than the radius of curvature of each of the other two side slide contact surfaces so that the magnetic tape and the center slide-contact surface have a fixed spacing therebetween and the other two side slide contact surfaces are in direct contact with the magnetic tape.

3. The magnetic recording/reproducing apparatus according to claim 2, wherein the magnetic tape has a means for providing a tape tension per magnetic tape width in the vicinity of a rotary drum entrance of 0.5–1.0 gf/mm and a head projection amount of 5–30 μm.

4. A magnetic head of a magnetic recording medium having a magnetic tape, said magnetic head comprising:
   an MR element supported in a substrate supporting the MR element at a head gap portion G;

said substrate supporting the MR element from both sides thereof at a center portion and having a slide contact surface having a uniform radius of curvature Rx in a width direction and a radius of curvature Ry in a thickness direction comprising a plurality of large and small curvatures, in which the magnetic tape of the magnetic recording medium is in slide-contact directly with or through an air cushion relative to a slide-contact surface of said substrate provided by a space S therebetween, wherein said slide contact surface has three slide contact surfaces and a radius of curvature of said slide contact surface in a thickness direction of said slide-contact surface is set to be larger at a center thereof than the radius of curvature at both of the other two slide contact surfaces so that the magnetic tape and the center slide-contact surface have a fixed spacing therebetween and at least the side slide contact surfaces are in direct contact with the magnetic tape, wherein said magnetic head is mounted on a rotary drum and is used for reproducing information recorded on the magnetic tape, and means for providing tension on said tape to maintain said spacing S between said tape and said slide contact surface, wherein a worn amount of said MR head is lessened and wear is suppressed.

5. The magnetic head set forth in claim 4 wherein the radius of curvature of both side portions is on the order of 0.5 to 3 mm and the radius of curvature at the center portion is formed to be larger than 5 mm.

6. The MR head as set forth in claim 4 further including an additional radius of curvature in ascending order from an outer side to a center of said head ranging from a small radius of curvature to a larger larger radius curvature in said order.

* * * * *